Patented Sept. 25, 1928.

1,685,444

UNITED STATES PATENT OFFICE.

GEORGES EMMANUEL ZELGER, OF MONTREUIL, FRANCE, ASSIGNOR, BY MESNE ASSIGNMENTS, TO DU PONT-PATHE FILM MANUFACTURING CORPORATION, OF WILMINGTON, DELAWARE, A CORPORATION OF DELAWARE.

METHOD FOR THE MANUFACTURE OF PLASTIC COMPOUNDS.

No Drawing. Original application filed April 6, 1925, Serial No. 21,197, and in France March 10, 1925. Divided and this application filed July 30, 1926. Serial No. 126,102.

It has been proposed to employ for the manufacture of plastic compounds, and chiefly acetyl-cellulose compounds, certain substances which, when added to the said compounds render the latter uninflammable. Among the said substances are comprised the phosphates of the purely aromatic series, such as triphenylphosphate and tricresylphosphate, but these substances are chiefly disadvantageous from the fact that they will not dissolve acetylcellulose in the cold state, thus causing a diminution in the mechanical properties of the resulting plastic compound.

The present invention which is a division of my pending application No. 21,197, filed April 6th, 1925, has for its object the use for the manufacture of plastic compounds having cellulose derivatives as a base, of mixed phosphoric esters containing one or more aliphatic radicals as well as one or more aromatic radicals, the nucleus of these latter radicals containing other elements, such as chlorine, bromine and the like.

Among the said compounds which can only be volatilized at high temperatures are comprised the esters having one or more aliphatic groups and one or more halogen substituted aromatic groups such as:

Monomethyl, di (monochlorophenyl) phosphate
$$(CH_3)(C_6H_4Cl)_2PO_4$$

Monomethyl, monophenyl, monochlorophenyl phosphate
$$(CH_3)(C_6H_5)(C_6H_4Cl)PO_4$$

Dimethyl, monochlorophenyl phosphate
$$(CH_3)_2(C_6H_4Cl)PO_4$$

Dimethyl, mono (dichlorophenyl) phosphate
$$(CH_3)_2(C_6H_3Cl_2)PO_4$$

Diethyl, monochlorophenyl phosphate
$$(C_2H_5)_2(C_6H_4Cl)PO_4$$

The following example of the said process may be given:
100 parts acetylcellulose
20 parts monoethyl di (monochlorophenyl) phosphate these being mixed and stirred in the known manner for obtaining the requisite plastic compound.

The invention is not limited to the above mentioned proportions for these may be varied according to the qualities which the finished product is to have.

The use of the substances above indicated is not limited to the preparation of acetyl cellulose plastic compounds but they may be employed with other cellulose derivatives; namely, nitroacetate of cellulose, or with cellulose ethers such as ethyl cellulose, benzyl cellulose and the like, for which the said substances act either as fireproof substances, or as substances which are at the same time fireproof, plastic and solvent.

Having now described my invention, what I claim as new and desire to secure by Letters Patent is:

1. A plastic compound comprising a mixture of a cellulose derivative with phosphoric esters containing both aliphatic radicals and halogenated aromatic radicals.

2. A plastic compound comprising a mixture of acetylcellulose with phosphoric esters containing both aliphatic radicals and halogenated aromatic radicals.

In testimony whereof I have signed my name to this specification.

GEORGES EMMANUEL ZELGER.